United States Patent
Sun et al.

(10) Patent No.: US 10,681,321 B2
(45) Date of Patent: Jun. 9, 2020

(54) SUPPRESS PIXEL COLORATION ERRORS IN HDR VIDEO SYSTEMS

(71) Applicant: Nvidia Corporation, Santa Clara, CA (US)

(72) Inventors: Yanbo Sun, Santa Clara, CA (US); Gennady Petrov, Santa Clara, CA (US); Lauri Hyvarinen, Helsinki (FI); Weiwan Liu, Santa Clara, CA (US); Dong Han Ryu, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/156,890

(22) Filed: Oct. 10, 2018

(65) Prior Publication Data

US 2020/0068181 A1 Feb. 27, 2020

Related U.S. Application Data

(60) Provisional application No. 62/720,635, filed on Aug. 21, 2018.

(51) Int. Cl.
| | |
|---|---|
| G06T 5/00 | (2006.01) |
| H04N 9/64 | (2006.01) |
| H04N 9/77 | (2006.01) |
| H04N 9/72 | (2006.01) |
| H04N 9/67 | (2006.01) |

(52) U.S. Cl.
CPC .............. *H04N 9/646* (2013.01); *G06T 5/008* (2013.01); *H04N 9/67* (2013.01); *H04N 9/72* (2013.01); *H04N 9/77* (2013.01); *G06T 2207/20208* (2013.01)

(58) Field of Classification Search
CPC ......... G06T 5/002; G06T 5/007; G06T 5/008; G06T 2207/202; H04N 9/646; H04N 9/67; H04N 9/77; H04N 9/72
See application file for complete search history.

(56) References Cited

U.S. PATENT DOCUMENTS

| | | | |
|---|---|---|---|
| 2015/0341604 A1* | 11/2015 | Cote ...................... | H04N 9/64 348/242 |
| 2016/0343115 A1* | 11/2016 | Kusumi .................. | G06T 5/002 |
| 2017/0118489 A1* | 4/2017 | Berbecel .............. | H04N 19/593 |

* cited by examiner

*Primary Examiner* — Diane M Wills

(57) ABSTRACT

The present disclosure is directed to a process to partially or fully suppress, or limit, pixel coloration errors. These pixel coloration errors, represented by small noise values, can be introduced during signal processing of high dynamic range (HDR) video signals. Converting visual content to a half precision floating point representation, for example, FP16, can introduce small amounts of signal noise due to value rounding. The noise can be multiplied and accumulated during HDR signal processing resulting in visual artifacts and degraded image quality. The disclosure can detect these noise amounts in pixel color component values, and suppress, or partially suppress, the noise to prevent the noise from accumulating during subsequent HDR signal processing.

22 Claims, 5 Drawing Sheets

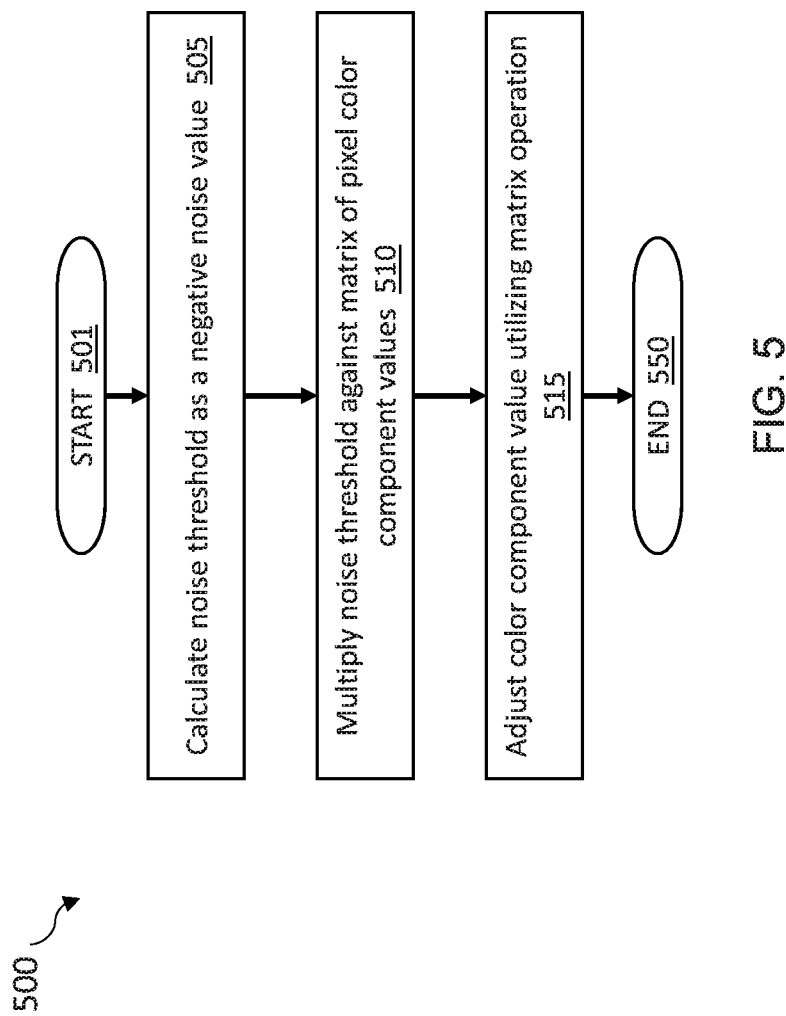

SUPPRESS PIXEL COLORATION ERRORS IN HDR VIDEO SYSTEMS

CROSS-REFERENCE TO RELATED APPLICATION

This application claims the benefit of U.S. Provisional Application Ser. No. 62/720,635, filed by Yanbo Sun, et al. on Aug. 21, 2018, entitled "HDR QUALITY IMPROVEMENT WITH QUANTIZATION NOISE SUPPRESSION," commonly assigned with this application and incorporated herein by reference.

TECHNICAL FIELD

This application is directed, in general, to a pixel color component correction method and, more specifically, to suppressing coloration errors in high dynamic range (HDR) video systems.

BACKGROUND

In computer graphics and video systems, HDR graphic and video content can be generated in linear extended red-green-blue (scRGB) color space with half precision floating point format (FP16, defined in IEEE 754-2008). To drive an HDR display, the FP16 pixel can be converted to perceptual quantizer (PQ) encoded RGB or YCbCr (as defined by ITU-R BT2100 standard) HDR signals. During that encoding process, quantization errors present in the original FP16 content can be amplified due to a combination of color space conversions, PQ encoding, Chroma filtering, and subsampling. Such errors will be further amplified by an HDR display that processes the PQ encoded HDR signals by performing, for example, Chroma upsampling, color space conversion matrix, and PQ decoding operations. Such amplified errors result in artifacts being displayed on HDR displays that are visible to a user viewing the content on the HDR display, thereby lowering the quality of the displayed content.

SUMMARY

In one aspect, a method to suppress pixel color component noise in a high dynamic range (HDR) signal is described. In one embodiment, the method includes: (1) converting a color value representation of a pixel to a color value representation having less precision, wherein the converting creates a noise level in one or more color component values of the pixel, (2) comparing the color component values to a noise threshold for the pixel, and (3) reducing, utilizing the comparing, one or more of the color component values of the pixel, wherein the noise threshold is computed from the noise level.

In another aspect, a computer program product having a series of operating instructions stored on a non-transitory computer-readable medium that directs a data processing apparatus when executed thereby to perform operations to suppress noise in color component values of a pixel for an HDR signal is described. In one embodiment, the operations include: (1) converting a color value representation of a pixel to a color value representation having less precision, wherein the converting creates a noise level in one or more color component values of the pixel, (2) comparing the color component values to a noise threshold for the pixel, and (3) reducing, utilizing the comparing, one or more of the color component values of the pixel, wherein the noise threshold is computed from the noise level.

In another aspect, a noise suppression system for pixel color component values is described. In one embodiment, the noise suppression system includes: (1) a receiver, operable to receive an HDR content as an HDR signal, and (2) wherein one of the HDR signal processes is a noise suppression process for one or more of the pixels of said HDR signal, and wherein the noise suppression process compares a calculated noise threshold to the color component values of the pixel to clamp to a value of zero, one or more of the color component values of the pixel, and wherein the calculated noise threshold is computed utilizing a noise level of the pixel and a noise factor.

BRIEF DESCRIPTION

Reference is now made to the following descriptions taken in conjunction with the accompanying drawings, in which:

FIG. 5 is an illustration of a flow diagram of an example method, building on FIG. 3, demonstrating using negative noise and pixel color component matrix to suppress noise in an HDR signal.

DETAILED DESCRIPTION

Figure 1:
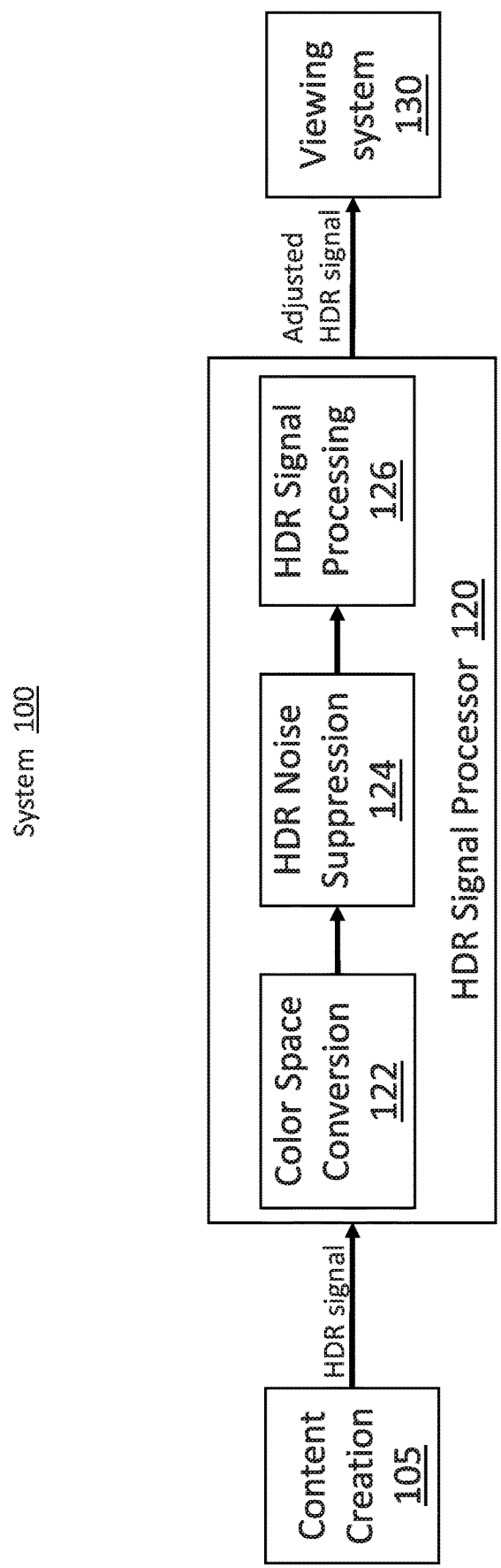
FIG. 1 is an illustration of a block diagram of an example high dynamic range (HDR) signal processing system.

Users, through their actions, can cause content to be displayed on a viewing system, such as a television, monitor, smartphone, and other devices. The content can be various types of content, such as the visual output from an application executing on a computing system or a video playback from a server or data center. The content can be provided to the viewing system in different formats, such as standard dynamic range (SDR) (typical for some web content and older television programming) and high dynamic range (HDR) (typical for gaming applications, newer television and movie content, and other high definition content).

During the display of graphic, image, or video content on an HDR viewing system, the content can be processed through one or more HDR signal processes prior to being displayed for a user. The HDR signal, representing the content, can be processed in different ways. The processing steps can be selected to decrease storage and transmission bandwidth requirements, or to improve the HDR content, for example, by adjusting the colors or luminescence due to the ambient lighting in the room where the viewing system is located. The processing steps can be to alter the HDR signal to use a half precision floating point format, for example, FP16, to decrease the signal's storage space requirements. Other floating point representations can be used as well, such as 24 bit and 12 bit. This disclosure will use FP16 as the demonstration representation. Encoding the HDR signal using a perceptual quantizer (PQ) encoding can reduce the bit width of the HDR signal to allow for a more efficient storage and transmission of the encoded signal. Another process that can be applied to the HDR signal is Chroma subsampling to further reduce storage and transmission bandwidth requirements. Other techniques and processes for the HDR signal can also be applied. These techniques and processes can be applied in various combinations as well, such as to reduce storage requirements and also to improve the HDR signal.

One potential side effect of applying these techniques and processes to an HDR signal can be that a small amount of noise, e.g., error, in the signal can be amplified or accumulated during the various processing steps. A noise in the signal may be imperceptible to a user at the beginning of the processing, and be a noticeable distraction (visual artifact) to the user at the end of the processing steps, as the processes may unintentionally increase the noise effect on the signal. Presented herein is an additional processing step to identify the noise in the HDR signal and gently reduce or remove that noise from the signal. Therefore, at the end of the processing steps, the signal does not have an amplified or accumulated noise causing a visual artifact for the user. The additional processing step can be included in the HDR signal processing flows. The additional processing step can be included near the beginning of the cycle or at various points of the cycle.

In more detail, in a computer graphics system, an HDR pixel is typically represented in a form of a light linear signal or a PQ encoded signal, i.e., HDR10 or another standard. A light linear signal is required for color space conversion (CSC) and other optical to optical processing. Due to the signal's high dynamic range (typically 0.0-10,000 nits), a 32-bit integer or FP16 can be used to represent a pixel as a light linear signal.

After transforming content to an HDR signal FP16 scRGB representation, some quantization error can be introduced. This quantization error, i.e., noise, is typically below the ability of an average user to detect, therefore there are no noticeable visual artifacts. The quantization error in each of the scRGB component values can be distributed and contributed to other components after a CSC. A small absolute noise value can generate a large noise value in PQ because the PQ inverse electro-optical transfer function (EOTF$^{-1}$) is sensitive to small values. In addition, the RGB to YCbCr conversion processing steps and subsampling, and the respective reverse processing in video processing, distribution, and transmission, changes the noise distribution. Noise can be accumulated through these processes and become a larger portion of each color component value. Since PQ EOTF$^{-1}$ can be sensitive to larger color component values (of which the noise is a portion), PQ EOTF$^{-1}$ can generate a significant color error in linear light space when a pixel is displayed, resulting in visual artifacts noticeable by a user.

Since FP16 quantization error can be the source of the noise, one solution is to use full single point float precision (FP32) or double float point precision (FP64) data values. The solution would result in requiring more frame buffer storage and memory bandwidth, and can require additional processing resources thereby increasing hardware and power requirements. Another option can be to introduce a dithering technique to reduce quantization noise. This can be implemented by introducing spatial random noise to eliminate a repetitive noise pattern. Such an approach can result in content quality loss. A third approach of clamping a color component value below an absolute noise threshold, i.e., a global clamping value, can prevent noise from being carried through the remaining processing steps. Under some signal situations, colors that are very dark may be clamped that should not be clamped, thereby possibly preventing the content display from meeting the HDR low luminescence specifications and standards.

Thus, this disclosure describes an additional step or approach that includes a quantization noise suppression process for an HDR signal, utilizing pixel level clamping, while maintaining the storage and transmission bandwidth requirements, and maintaining the content visual quality. Typically, the quantization noise suppression step can be included between the CSC and PQ encoding steps, though the quantization noise suppression can be included at other points in the HDR signal processing flow. In an alternative aspect, the quantization noise suppression can be included in the processing if spatial pixel processing or temporal pixel processing will be performed on the PQ signals.

The quantization noise suppression can be a separate step, or it can be included with an existing step, such as combined with the CSC or combined with the PQ encoding. The quantization noise suppression can be implemented using various approaches. For example, for each pixel in an HDR signal, the process can determine the maximum color component value from the three color component values, i.e., the maximum value, as shown in Formula 1.

Formula 1:

Example for finding a maximum color component value for a pixel $$maxComponentValue = max(R,G,B)$$

where R, G, B represent the red, green, and blue color component values.

Alternatively, the luminance value Y for the pixel can be calculated from the color component values as shown in Formula 2.

Formula 2:

Example for calculating a luminance value for a pixel $$Y = (C1*R) + (C2*G) + (C3*B)$$

where C1, C2, and C3 are constants for converting a RGB value to a luminance value Y.

A quantization noise threshold can be calculated using either the maxComponentValue or Y, and a noise factor. The determination of whether to use the maxComponentValue or Y can be based on several factors, such as the hardware being utilized and the software capability and limitations. Typically, using the luminance Y is more efficient during processing. Luminance Y can also result in a better visual display quality of the signal since the color component value for green typically is the dominant color component and Y better accounts for this dominance.

The noise factor can be determined by the process, application, or other system component. The noise factor typically is initiated to 1/2048 for HDR signals. Other values can be utilized as well including, for example, 1/1024, 1/512, 1.5/2048. Longer HDR signal processing flows can result in a greater chance that a small noise can be accumulated or multiplied to a large enough value, which may exceed a target value for noise. Such target value can be set at a point where at, or above, that point the noise would be noticeable by a user, i.e., cause noticeable visual artifacts. In longer HDR signal processing flows, an increase in the noise factor value can be beneficial to clamp an appropriate amount of noise from each pixel. As the noise factor increases, the possibility of affecting the HDR low luminance capability increases as well, thereby possibly adversely affecting the displayed content for the user.

The noise threshold can be calculated by multiplying the noise factor and either the maxComponentValue or Y, as shown in Formula 3 and Formula 4.

Formula 3:

Example of calculating a noise threshold using the maxComponentValue $$noiseThreshold = noise\ factor * maxComponentValue$$

Formula 4:

Example of calculating a noise threshold using Y $$noiseThreshold = noise\ factor * Y$$

After calculating the noise threshold, a comparison is executed against each of the color component values. If the absolute value of the color component value is less than the noise threshold, then the color component value is likely dominated by noise. Therefore, the color component value can be reset, i.e., clamped, to zero. This is a pixel level clamping, where each pixel analyzed may or may not have a different noise threshold for comparison. Formula 5 shows an example algorithm to clamp a color component value.

Formula 5:

Example of clamping color component values $$R_{NS}=(\text{abs}(R)>\text{noiseThreshold})R:0$$

$$G_{NS}=(\text{abs}(G)>\text{noiseThreshold})G:0$$

$$B_{NS}=(\text{abs}(B)>\text{noiseThreshold})B:0$$

where $R_{NS}$, $G_{NS}$, and $B_{NS}$ are the respective color component values after the noise suppression. An example implementation in pseudo code is demonstrated in Listing 1.

---

Listing 1: Example pseudo code of HDR signal noise suppression in GLSL ES shader, with a noise factor of 1/2048

```
vec4 noise_suppression (vec4 v)
{
  const float noise_factor = 1.0 / 2048.0;
  // Compute relative luminance = 0.2627 * R + 0.6780 * G + 0.0593 * B
  // for BT.2020 RGB value
  float relative_luminance = dot(v.xyz, vec3(0.2627, 0.6780, 0.0593));
  float noise_threshold = relative_luminance * noise_factor;
  // Use step( ) and mix( ) to suppress values below noise threshold
  v.xyz = mix(vec3(0.f, 0.f, 0.f), v.xyz, step(noise_threshold, v.xyz));
  return v;
} // end vec4 function
```

---

An alternative method to implementing the quantization noise suppression process is to detect whether a pixel's color component value is dominated by quantization noise and then removing, i.e., canceling the noise. Canceling the noise can be achieved by adding a negative quantity equal to the detected noise of the Y value of the pixel. The negative quantity can be assigned as the negative noise. The noise threshold can be calculated as shown in Formula 4. The negative noise is the noise threshold with its sign inversed.

The resulting color component values can be clamped to zero, if they fall below zero. The clamping can be completed prior to PQ encoding since clamping is a common operation for the PQ transfer function, which has an input range of 0.0 to 1.0. This method can take advantage of fixed hardware pipelines that have matrix conversion capabilities. Formula 6 demonstrates two forms of an example matrix operation to suppress noise by using a negative noise value.

Formula 6

Example matrices using negative noise to suppress noise $$\begin{pmatrix} R' \\ G' \\ B' \end{pmatrix} = \begin{pmatrix} 1 & 0 & 0 \\ 0 & 1 & 0 \\ 0 & 0 & 1 \end{pmatrix} \begin{pmatrix} R \\ G \\ B \end{pmatrix} + \text{negative\_noise} * \begin{pmatrix} 0.2627 & 0.6780 & 0.0593 \\ 0.2627 & 0.6780 & 0.0593 \\ 0.2627 & 0.6780 & 0.0593 \end{pmatrix} \begin{pmatrix} R \\ G \\ B \end{pmatrix}$$

Which can be combined into a single matrix:

$$\begin{pmatrix} R' \\ G' \\ B' \end{pmatrix} = \begin{pmatrix} 1+0.2627*\text{negative\_noise} & 0.6780*\text{negative\_noise} & 0.0593*\text{negative\_noise} \\ 0.2627*\text{negative\_noise} & 1+0.6780*\text{negative\_noise} & 0.0593*\text{negative\_noise} \\ 0.2627*\text{negative\_noise} & 0.6780*\text{negative\_noise} & 1+0.0593*\text{negative\_noise} \end{pmatrix} \begin{pmatrix} R \\ G \\ B \end{pmatrix}$$

where R', G', and B' are the resulting color component values from the matrix operation.

An alternative matrix operation can be used as shown in Formula 7. The simplified matrix may not provide the same noise threshold for the three color components as the matrices shown in Formula 6. The calculations may be more efficient and not result in the noise accumulation exceeding the target value. Formula 7 utilizes a negative noise value that is directly determined by the system, similar to the noise factor as used in Formulae 3 and 4. The negative noise in Formula 7, labeled as negative_noise', can be a negative factor, for example, $$\frac{-1.5}{2048},$$

a negative representation of the values as listed for the noise factor above, or other negative values.

Example matrix operation to suppress noise  Formula 7

$$\begin{pmatrix} R' \\ G' \\ B' \end{pmatrix} = \begin{pmatrix} 1 & \text{negative\_noise}' & \text{negative\_noise}' \\ \text{negative\_noise}' & 1 & \text{negative\_noise}' \\ \text{negative\_noise}' & \text{negative\_noise}' & 1 \end{pmatrix} \begin{pmatrix} R \\ G \\ B \end{pmatrix}$$

In an alternative aspect, the negative noise matrices, as shown in the various formulas above, can be applied as a standalone operation or be combined with other matrix operations. For example, a combined matrix for including noise suppression with a scRGB to Rec2020 RGB transfer can be demonstrated in Formula 8.

Formula 8

Example combined matrix, combining a transfer function with noise suppression $$\begin{pmatrix} 1+0.2627*\text{negative\_noise} & 0.6780*\text{negative\_noise} & 0.0593*\text{negative\_noise} \\ 0.2627*\text{negative\_noise} & 1+0.6780*\text{negative\_noise} & 0.0593*\text{negative\_noise} \\ 0.2627*\text{negative\_noise} & 0.6780*\text{negative\_noise} & 1+0.0593*\text{negative\_noise} \end{pmatrix} *$$

$$\begin{pmatrix} 0.627403896077687 & 0.329283038602093 & 0.043313065649504 \\ 0.069097289651083 & 0.919540395371749 & 0.011362315896708 \\ 0.016391438709584 & 0.088013307825009 & 0.895595253553420 \end{pmatrix}$$

Formula 8 effectively adds additional negative quantization noise to the R, G, and B component. The color noise level for the pixel may increase. As long as the color error remains below the noise accumulation target value, the noise will not impact the user's visual experience. If a color component value is less than the negative noise of the luminescence value or the negative noise of the sum of the other two components, the component can be dominated by noise and can be clamped to zero before PQ encoding, which can prevent noise from spreading to the PQ signals.

Turning now to the figures, FIG. 1 is an illustration of a block diagram of an example HDR signal processing system 100. HDR signal processing system 100 can be used to transform graphic, image, or video content to a form that can be transmitted to a viewing system. HDR signal processing system 100 includes a content creation system 105, an HDR signal processor 120, and a viewing system 130.

Content creation system 105 can create content of various types, such as graphics, images, and videos. The content can be generated from an application or pulled from another source, for example, pulled from a data center, a database, hard drive, computing system, internet, intranet, and other sources. The content can be transmitted to the HDR signal processor 120 as an HDR signal. There can be one or more processes applied to the HDR signal, and each of the processes can be applied in various orders and combinations.

By demonstrated example, the received HDR signal can first be processed by a CSC process 122. The HDR signal can then be processed by an HDR noise suppression process 124. The HDR signal can then further be processed by one or more additional HDR signal processes 126. The adjusted HDR signal can be transmitted to another process or system, using a communicator (not shown). In this example, the HDR signal is transmitted to viewing system 130, which can be a conventional type of viewing system, display, monitor, projector, or other type of viewing system. In alternative aspects, the HDR signal can be transmitted to other systems, such as through an intranet, internet, or other transmission medium. In other aspects, the HDR signal can be transmitted to a storage medium, for example, a database, data center, server, system, hard disk, USB key, or other types of storage mediums.

HDR signal processor 120 represents a logical description of the functionality and can be implemented in various combinations. For example, HDR signal processor 120 can be a central processing unit (CPU), a graphics processing unit (GPU), or a general processor. HDR signal processor 120 can be included in a single processor or the functionality can be executed on two or more processors. For example, some of the functions of the HDR signal processor 120 can be executed within a GPU and some of the HDR signal processing can be executed within the viewing system 130.

Figure 2:
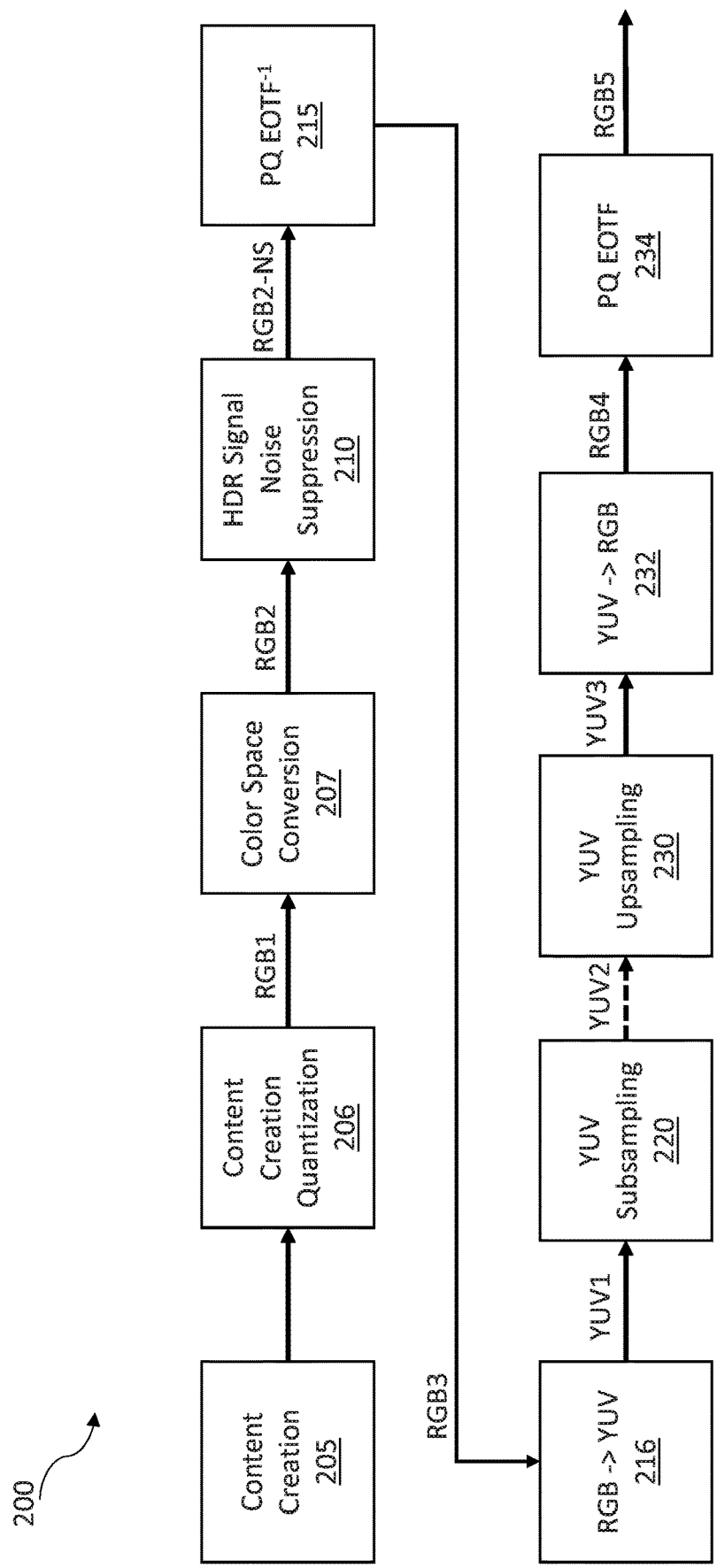
FIG. 2 is an illustration of a block diagram of an example HDR signal processing flow.

FIG. 2 is an illustration of a diagram of an example HDR signal processing flow 200. HDR signal processing flow 200 is an example flow of an HDR signal from the point the content is identified to the final output to a viewing system. The processes described in this flow are demonstrating an example flow. Processes utilized in other flows can vary as to which specific processes are included in the overall HDR signal processing flow. Generally, the more processes included in the overall HDR signal processing flow, the greater the noise factor should be to compensate for the possible accumulation of noise through the process flows. In the content creation process 205, content can be created and gathered. For example, an application can generate content, or the content creation process 205 can retrieve content from a source, such as the internet, intranet, or a storage medium.

In the content creation quantization process flow 206, high precision signals from the content, i.e., single float and double float signals, are quantized to FP16 representation with rounding or truncation. Each quantized FP16 representation can contain a rounding error up to $1/2048$ relative to an ideal value. This can result in a signal to noise ratio (SNR) being $>=2048$ on each color component value of a pixel. The color of the pixel, represented by all three color component values, can have an error of less than, or equal to, $1/2048$. The color error (or noise) is far below the target value threshold for noise accumulation and can be imperceptible by a user. The output of flow 206 is represented by the signal RGB1.

In the CSC process flow 207, a matrix operation can be utilized to perform the conversion thereby causing quantization noise from each RGB1 color component value to be spread out to all color components, represented by the signal RGB2. There can be several noise levels to be considered at this point in the process flow. One such noise level is the overall color noise relative to the signal RGB2 color, as represented by the three color component values. Another noise level can be represented by the noise in each RGB2 component relative to each RGB2 color component value. The color noise level can remain the same before and after the matrix operation. The component noise can be accumulative, depending on the sign of the noise, and the component and matrix coefficient values. A color component value depends on the component and matrix values. For example, noise to component ratio for color R can be described as shown in Formula 9.

Example noise to component ratio — Formula 9

$$\frac{\text{Noise} \cdot R2}{R2} = \frac{clr*\text{Noise}\cdot R1 + clg*\text{Noise}\cdot G1 + clb*\text{Noise}\cdot B1}{clr* R1 + clg*G1 + clb*B1}$$

where R1, G1, B1, and R2 are ideal color component values;
Noise.R1, Noise.G1, and Noise.B1 are quantization errors introduced when R1, G1, B1 are quantized to FP16; and
clr, clg and clb are matrix coefficients for performing CSC, e.g., (clr, clg, clb)=(0.627403896077687, 0.329283038602093, 0.043313065649504).

After the matrix operation, the component noise to signal ratio can be high, when the new expected color component value is near 0.0. In some cases, the component value becomes dominated by noise. In the HDR signal noise suppression process flow 210, the color component values for each pixel of the HDR signal can be analyzed, adjusted and clamped as needed, as described herein. Process flow 210 represents this disclosure in the overall HDR signal process flow. The output is represented by the signal RGB2-NS (RGB2 with noise suppression).

In the PQ EOTF$^{-1}$ process flow 215, RGB2-NS can be scaled by a factor, such as 0.008, if 80-nits is nominalized to a floating point representation, such as 1.0f, and then clipped to a range of 0.0 to 1.0, so that the value of 1.0 represents 10,000-nits light signal, and the value of 0.0 represents true black. Other factors can be utilized, though, conventionally 1.0f is used to represent 80-nits, for example, the PC sRGB (standard dynamic range) standard. For example, RGB2-NS'=clip (RGB2-NS*0.008, 0.0, 1.0). The normalized pixel RGB2-NS' can then be further encoded by a standard PQ transfer function. For example, R3=PQ_EOTF$^{-1}$(R2-NS'), G3=PQ_EOTF$^{-1}$(G2-NS'), and B3=PQ_EOTF$^{-1}$(B2-NS'), where R2-NS', G2-NS', and B2-NS' represent the color component values of the signal RGB2-NS'. The PQ_EOTF$^{-1}$ can be implemented using Formula 10.

Example PQ EOTF$^{-1}$   Formula 10

$$f(x) = \left(\frac{c1 + c2 * x^{m1}}{1 + c3 * x^{m1}}\right)^{m2}$$

where x denotes a linear HDR optical color value;
  m1=2610/(4096*4)=0.15930175;
  m2=(2523*128)/4096=78.84375;
  c1=3424/4096=0.8359375;
  c2=(2413*32)/4096=18.8515625; and
  c3=(2392*32)/4096=18.6875.

The inverse PQ function can provide an efficient coding based on how the human vision system contrasts sensitivity, e.g., more color values at low intensity (dark) tones are used to minimize relative contrast error. Inverse PQ transfer functions can also be very sensitive to small absolute noise. Noise to signal ratios in PQ encoded signals generally do not result in perceptible color noise to a user. Also, the PQ noise is reversible if a function, such as the PQ electro-optical transfer function (EOTF) is placed immediately after the process flow to reverse the PQ EOTF$^{-1}$. The output of the PQ EOTF$^{-1}$ process flow 215 is represented by the signal RGB3.

In the RGB to YUV process flow 216, the signal RGB3 can be further converted to YCbCr color format through a matrix operation as demonstrated in Formula 11.

Example RGB to YUV conversion   Formula 11

$$\begin{pmatrix} Y \\ Cb \\ Cr \end{pmatrix} = \begin{pmatrix} 0.26270 & 0.67800 & 0.05930 \\ -0.13963 & -0.36037 & 0.50000 \\ 0.50000 & -0.45979 & -0.04021 \end{pmatrix} * \begin{pmatrix} R3 \\ G3 \\ B3 \end{pmatrix}$$

where R3, G3, and B3 represent the color component values from the signal RGB3;
  Y is the luminescence value;
  Cb is the blue difference Chroma component; and
  Cr is the red difference Chroma component.

If not suppressed, the absolute value of any PQ noise from signal RGB3 components can be distributed to each Y, Cb, and Cr component of output signal YUV1. Signal YUV1, using, for example, standard HDR YUV444, can contain large absolute and relative component noise that can be contributed from large noise on one or more component values of signal RGB3.

In the YUV subsampling process flow 220, neighboring YCbCr pixels can be used for filtering and subsampling to generate an output signal YUV2, using, for example, standard HDR YUV 420 or 422. YUV2 is represented by a dashed line indicating that this point of the process can cross over to another system, such as a display device. If not suppressed, the large absolute and relative noise in CbCr components can be distributed and accumulated. The resulting signal YUV2 can be further processed and displayed on a viewing system.

In the YUV upsampling process flow 230, groups of subsampled YCbCr pixels can be used for filtering to produce missing CbCr pixel components. If not suppressed, the PQ noise from the previous steps can be further distributed and accumulated. The output can be represented by signal YUV3, using, for example, standard HDR YUV444.

In the YUV to RGB process flow 232, the signal YUV3 can be converted to signal RGB4 using a conventional CSC matrix, as demonstrated in Formula 12. Signal RGB4 can be encoded using, for example, standard BT2020 PQ.

Example YUV to RGB conversion   Formula 12

$$\begin{pmatrix} R \\ G \\ B \end{pmatrix} = \begin{pmatrix} 1.0 & 0 & 1.4746 \\ 1.0 & -0.164553 & -0.571353 \\ 1.0 & 1.8814 & 0 \end{pmatrix} * \begin{pmatrix} Y \\ Cb \\ Cr \end{pmatrix}$$

In the PQ EOTF process flow 234, PQ encoded signal RGB4 can be transformed to a linear signal through the PQ EOTF transfer function. The output signal can be represented by signal RGB5 and can be encoded using, for example, standard BT2020 RGB. Formula 13 demonstrates an example PQ EOTF.

Example PQ EOTF   Formula 13

$$f(x) = \left(\frac{\max[(x^{1/m2} - c1), 0]}{c2 - c3 * x1^{1/m2}}\right)^{1/m1}$$

where x denotes a non-linear HDR electrical value;
  m1=2610/(4096*4)=0.15930175;
  m2=(2523*128)/4096=78.84375;
  c1=3424/4096=0.8359375;
  c2=(2413*32)/4096=18.8515625; and
  c3=(2392*32)/4096=18.6875.

If the HDR signal noise suppression is not included in the overall HDR signal processing flow, a small error in an input value can result in a significant error in the output values since PQ EOTF$^{-1}$ is sensitive to a large component value, of which the noise is a portion. In addition, an unsuppressed error in one color component value can spread to the other color component values through the various conversion algorithms. The resulting unsuppressed error in linear light space can be significant and can be perceptible to a user and result in visual artifacts and a decrease of visual quality of the displayed content.

Figure 3:
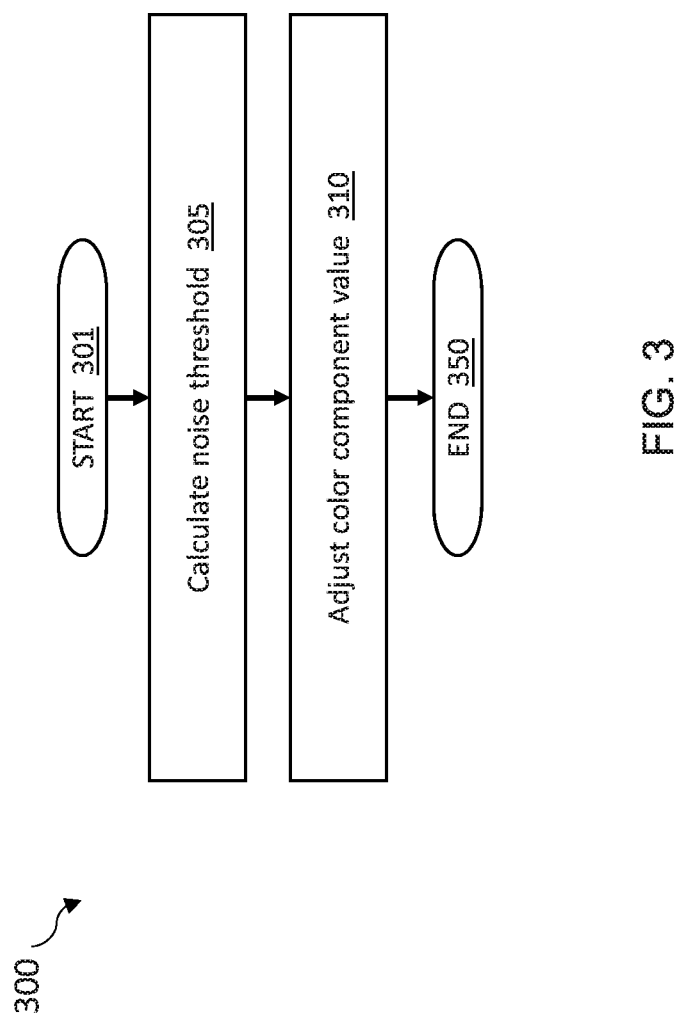
FIG. 3 is an illustration of a flow diagram of an example method to suppress noise in an HDR signal.

FIG. 3 is an illustration of a flow diagram of an example method 300 to suppress noise in an HDR signal. Method 300 begins at a step 301 and proceeds to a step 305. In the step 305, a received HDR signal is analyzed and a noise threshold is calculated. Proceeding to a step 310, the color component values for a pixel are adjusted using the noise threshold. The adjustment can suppress detected noise and prevent noise accumulation through the remaining process flow steps. The suppression can reduce noise or clamp the color component value to zero. The method ends at a step 350.

Figure 4:
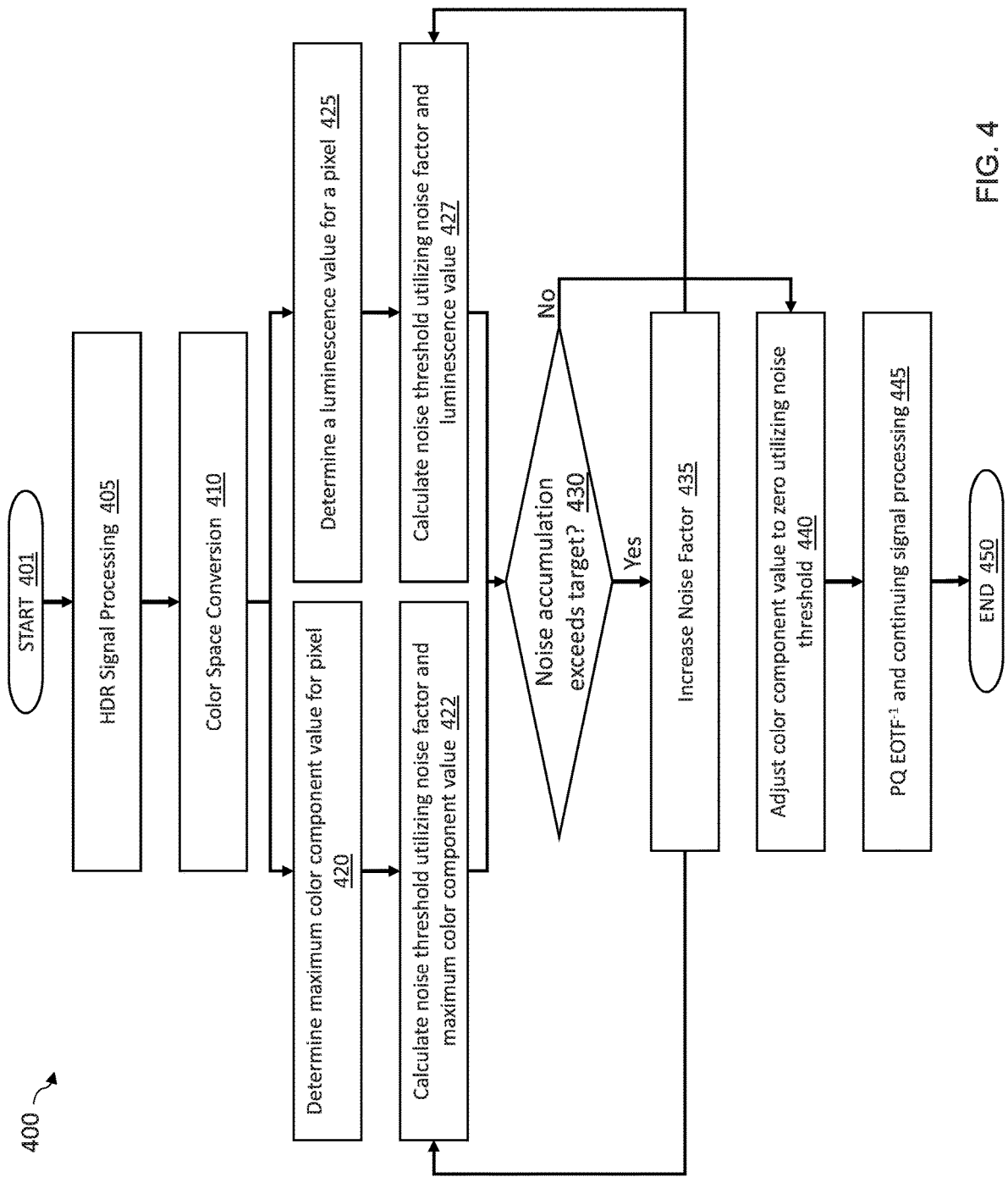
FIG. 4 is an illustration of a flow diagram of an example method, building on FIG. 3, demonstrating the calculation and usage of a noise threshold to suppress noise in an HDR signal.

FIG. 4 is an illustration of a flow diagram of an example method 400, building on FIG. 3, demonstrating the calculation and usage of a noise threshold to suppress noise in an HDR signal. The method 400 begins at a step 401 and proceeds to a step 405. In the step 405, the HDR signal processing begins on a received signal, where that signal represents visual content. Proceeding to a step 410, a CSC is performed on the HDR signal. Depending on the implementation, two paths are possible, one to a step 420 and one to a step 425.

If the step 420 is selected, the method 400 proceeds to the step 420. A determination is made of the maximum color component value for a pixel. Proceeding to a step 422, a noise threshold can be calculated utilizing a noise factor and the resultant from step 420. The method 400 proceeds to a decision step 430.

If the step 425 is selected from step 410, the method 400 proceeds to the step 425. The luminescence value for a pixel is computed. Proceeding to a step 427, a noise threshold can be calculated utilizing a noise factor and the resultant from step 425. The method 400 proceeds to a decision step 430.

In the decision step 430, a noise accumulation can be verified against a target value. If the value is exceeded, the method 400 proceeds to a step 435. In the step 435, the noise factor can be increased to compensate for the noise accumulation. The method 400 returns to the respective steps 422 or 427 to re-calculate the noise threshold. If the decision step 430 results in not exceeding the noise accumulation target value, then the method 400 proceeds to a step 440.

In a step 440, the color component values are adjusted to zero where the respective color component value is less than the noise threshold. Steps 420-440 or steps 425-440 are repeated for the remaining pixels in the HDR signal. Proceeding to a step 445, the HDR signal is processed through a PQ EOTF$^{-1}$ and any remaining HDR signal processing is completed. In an alternative aspect, steps 420-440 and steps 425-440 can be combined with step 410 or with step 445. The method ends at a step 450.

FIG. 5 is an illustration of a flow diagram of an example method 500, building on FIG. 3, demonstrating using negative noise and a pixel color component matrix to suppress noise in an HDR signal. Method 500 begins at a step 501 and proceeds to a step 505. In a step 505, a noise threshold is calculated as a negative noise value. In a step 510, the noise threshold is multiplied against a matrix of pixel color component values. In a step 515, the color component values are adjusted utilizing the matrix operation. Steps 505-515 can be repeated for remaining pixels in the received HDR signal. The method 500 ends at a step 550.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method to suppress pixel color component noise in a high dynamic range (HDR) signal, comprising:
   quantizing a color value representation of a pixel to a color value representation having less precision, wherein said quantizing creates a noise level in one or more color component values of said pixel;
   comparing said color component values to a noise threshold for said pixel; and
   reducing, utilizing said comparing, one or more of said color component values of said pixel, wherein said noise threshold is computed from said noise level.

2. The method as recited in claim 1, wherein said reducing clamps said color component value to zero, when said color component value is less than said noise threshold.

3. The method as recited in claim 1, wherein said reducing occurs, during a processing of said HDR signal, after a color space conversion (CSC) process and prior to a perceptual quantizer (PQ) inverse electro-optical transfer function process.

4. The method as recited in claim 1, wherein a spatial or temporal pixel processing is performed on said HDR signal.

5. The method as recited in claim 1, wherein said noise threshold utilizes a noise factor and a maximum value from said color component values.

6. The method as recited in claim 1, where said noise threshold utilizes a noise factor and a luminescence value computed from said color component values.

7. The method as recited in claim 6, wherein said noise factor is $\frac{1}{2048}$.

8. The method as recited in claim 7, further comprising:
   increasing said noise factor, where a noise accumulation exceeds a target value.

9. The method as recited in claim 1, wherein said noise threshold is a negative noise value, and wherein said reducing one or more of said color component values of said pixel comprises multiplying each of said one or more said color component values of said pixel with said noise threshold.

10. The method as recited in claim 9, wherein said reducing is combined with a scRGB to Rec2020RGB conversion process.

11. The method as recited in claim 9, wherein said reducing clamps said color component value to zero when said color component value is less than an absolute value of said noise threshold.

12. A computer program product having a series of operating instructions stored on a non-transitory computer-readable medium that directs a data processing apparatus when executed thereby to perform operations to suppress noise in color component values of a pixel for a high dynamic range (HDR) signal, said operations comprising:
   quantizing a color value representation of a pixel to a color value representation having less precision, wherein said quantizing creates a noise level in one or more color component values of said pixel;
   comparing said color component values to a noise threshold for said pixel; and
   reducing, utilizing said comparing, one or more of said color component values of said pixel, wherein said noise threshold is computed from said noise level.

13. The computer program product as recited in claim 12, wherein said reducing clamps said color component value to zero, where said color component value is less than an absolute value of said noise threshold.

14. The computer program product as recited in claim 12, wherein said reducing occurs, during a processing of said HDR signal, after a color space conversion (CSC) process and prior to a perceptual quantizer (PQ) inverse electro-optical transfer function process.

15. The computer program product as recited in claim 12, wherein a spatial or temporal pixel processing is performed on said HDR signal.

16. The computer program product as recited in claim 12, wherein said noise threshold utilizes a noise factor, and a maximum value from said color component values or a luminescence value computed from said color component values.

17. The computer program product as recited in claim 12, wherein said noise threshold is a negative noise value, and wherein said reducing one or more of said color component values of said pixel comprises multiplying each of said one or more said color component values of said pixel with said noise threshold.

18. The computer program product as recited in claim 12, further comprising:
   increasing a noise factor used to calculate said noise threshold, where a noise accumulation exceeds a target value.

19. A noise suppression system for color component values of a pixel, comprising:
   a receiver that receives a high dynamic range (HDR) content as an HDR signal; and
   a signal processor that executes processes on said HDR signal to generate an adjusted HDR signal,
   wherein one of said processes suppresses noise for one or more of said pixels of said HDR signal by comparing a calculated noise threshold to said color component values of said pixel to clamp to a value of zero, one or more of said color component values of said pixel, and
   wherein said calculated noise threshold is computed utilizing a noise level of said pixel and a noise factor and said signal processor analyzes a noise accumulation and increases said noise factor to compensate for said noise accumulation.

20. The noise suppression system as recited in claim 19, further comprising:
   a transmitter that transmits said adjusted HDR signal.

21. The noise suppression system as recited in claim 19, wherein said processes comprise at least one processor that performs spatial pixel processing or temporal pixel processing.

22. The noise suppression system as recited in claim 19, wherein said signal processor performs matrix operations and combines one or more HDR signal processes.

* * * * *